US008681690B2

(12) United States Patent
Wohlford et al.

(10) Patent No.: US 8,681,690 B2
(45) Date of Patent: Mar. 25, 2014

(54) TECHNIQUE FOR ENABLING MULTIPLE TERMINALS TO SIMULATE TRAFFIC OF A SINGLE VIRTUAL TERMINAL

(75) Inventors: Robert G. Wohlford, Arlington, VA (US); Donald K. Faust, Ashburn, VA (US); Robert J. Kikta, North Bend, WA (US)

(73) Assignee: Exelis Inc., McLean, VA (US)

( * ) Notice: Subject to any disclaimer, the term of this patent is extended or adjusted under 35 U.S.C. 154(b) by 208 days.

(21) Appl. No.: 13/072,300

(22) Filed: Mar. 25, 2011

(65) Prior Publication Data

US 2012/0243465 A1 Sep. 27, 2012

(51) Int. Cl.
*H04B 7/204* (2006.01)
*H04W 88/04* (2009.01)
*H04B 7/185* (2006.01)
*H04L 5/00* (2006.01)
*H04B 7/155* (2006.01)
*H04B 7/26* (2006.01)

(52) U.S. Cl.
CPC ........... *H04W 88/04* (2013.01); *H04B 7/18582* (2013.01); *H04L 5/003* (2013.01); *H04B 7/155* (2013.01); *H04B 7/2606* (2013.01)
USPC ........... 370/319; 370/310; 370/315; 370/316; 370/328

(58) Field of Classification Search
CPC .. H04B 7/2606; H04B 7/155; H04B 7/18582; H04L 2001/0097; H04L 5/0003; H04W 88/04
USPC ......................................... 370/315, 316, 319
See application file for complete search history.

(56) References Cited

U.S. PATENT DOCUMENTS

| 5,717,830 | A | * | 2/1998 | Sigler et al. ................. 455/426.1 |
| 6,021,309 | A | | 2/2000 | Sherman et al. |
| 6,073,014 | A | | 6/2000 | Blanchard et al. |
| 6,408,179 | B1 | | 6/2002 | Stosz et al. |
| 6,463,279 | B1 | | 10/2002 | Sherman et al. |
| 6,529,740 | B1 | * | 3/2003 | Ganucheau et al. .......... 455/519 |

(Continued)

FOREIGN PATENT DOCUMENTS

WO 0213023 A1 2/2002

OTHER PUBLICATIONS

Search Report in counterpart Great Britain Application No. 1205092.8; date of search: Jul. 21, 2012.

*Primary Examiner* — Kibrom T Hailu
*Assistant Examiner* — James P Duffy
(74) *Attorney, Agent, or Firm* — Edell, Shapiro & Finnan, LLC

(57) ABSTRACT

A technique for enabling multiple terminals to simulate data traffic of a single virtual terminal includes transmitting from a first transmitting terminal a request to establish a communication session between the first transmitting terminal and a receiving terminal, where the first transmitting terminal is one a plurality of transmitting terminals. The first transmitting terminal receives at least one message from the receiving terminal to establish the communication session. Once the communication session is established between the first transmitting terminal and the receiving terminal, data traffic is transmitted from the plurality of transmitting terminals to the receiving terminal within the communication session such that the receiving terminal is unaware that more than one transmitting terminal is transmitting within the communication session. The communication session is maintained by transmitting maintenance messages from at least one of the plurality of transmitting terminals to the receiving terminal throughout the communication session.

20 Claims, 4 Drawing Sheets

(56) References Cited

U.S. PATENT DOCUMENTS

| | | |
|---|---|---|
| 6,993,363 B1* | 1/2006 | Hsu ................ 455/567 |
| 7,440,427 B1 | 10/2008 | Katz |
| 2002/0114313 A1 | 8/2002 | Walsh et al. |
| 2005/0090276 A1* | 4/2005 | Rajkotia ................ 455/515 |
| 2006/0077918 A1* | 4/2006 | Mao et al. ................ 370/310 |
| 2007/0077884 A1 | 4/2007 | Regulinski et al. |
| 2009/0141685 A1* | 6/2009 | Berglund ................ 370/331 |
| 2011/0105126 A1* | 5/2011 | Liang et al. ................ 455/437 |

* cited by examiner

TECHNIQUE FOR ENABLING MULTIPLE TERMINALS TO SIMULATE TRAFFIC OF A SINGLE VIRTUAL TERMINAL

BACKGROUND

Efficient use of link resources is a concern in a wide range of communication systems. In certain instances, a terminal within a communication network may need to transmit or receive a message that requires use of a link or channel for only a very brief period of time. Sending such brief messages may be inefficient from a link usage standpoint, since the duration of the message itself may be a small fraction of the overall time required to establish and then tear down the link or channel required to transmit the message between transmitting and receiving terminals.

For example, the Iridium satellite system provides worldwide voice and data service to geographically distributed subscriber units (e.g., radios) using a constellation of low Earth orbit satellites. Each satellite contributes an array of antenna spot beams such that the satellite constellation provides coverage over the entire surface of the Earth. Iridium subscriber units may acquire information, such as sensor data, that needs to be shared with other units or with a network manager or a gateway device linked to other networks. One example of sensor data is position location information (PLI) such as GPS position data that indicates the subscriber unit's current position. In order to transmit data, a terminal must first establish a communication session with a satellite, which results in several seconds of link usage to transmit a message having a transmission duration of a fraction of a second. When numerous terminals are required to periodically transmit such data messages, a significant impact on link resources results. Accordingly, it would be desirable in this and other communication network contexts to have an efficient approach to transmitting intermittent data traffic or short burst messages.

SUMMARY

A technique for enabling multiple terminals to simulate data traffic of a single virtual terminal includes transmitting from a first transmitting terminal a request to establish a communication session between the first transmitting terminal and a receiving terminal, where the first transmitting terminal is one a plurality of transmitting terminals. The first transmitting terminal receives at least one message from the receiving terminal to establish the communication session. Once the communication session is established between the first transmitting terminal and the receiving terminal, data traffic is transmitted from the plurality of transmitting terminals to the receiving terminal within the communication session such that the other transmitting terminals are not required to establish a communication session with the receiving terminal, and the receiving terminal is unaware that more than one transmitting terminal is transmitting within the communication session. Any of a variety of multiplexing schemes can be used to share the communication session, including time division multiple access (TDMA), frequency division multiple access (FDMA), and code division multiple access (CDMA). The communication session is maintained by transmitting maintenance messages from at least one of the plurality of transmitting terminals to the receiving terminal throughout the communication session.

According to one option, only one transmitting terminal (e.g., the first transmitting terminal that established the session) transmits maintenance messages to maintain the session. According to another option, responsibility for sending maintenance messages to the receiving terminal to maintain the session is distributed among the network of transmitting terminals using the session to transmit data. For example, where a periodic maintenance message is required by the receiving terminal, the transmitting terminals within the network can take turns sending the periodic maintenance messages (e.g., if a particular transmitting terminal is scheduled to transmit data at a time when a maintenance message is required, that transmitting terminal assumes responsibility for sending the maintenance message).

Where the receiving terminal is a satellite providing a link for the communication session within a satellite beam coverage area, handing off of the session from one satellite antenna beam to another satellite antenna beam may be required where the satellite beam coverage area moves over time due to the low Earth (non-geostationary) orbit of the satellite. In this case, maintaining the communication session requires handling each handoff from one of the transmitting terminals. One option is to assign a single transmitting terminal (e.g., the first transmitting terminal that established the session) to handle all satellite beam handoffs. Another option is to distribute responsibility for handling satellite beam handoffs among the network of transmitting terminals sharing the session to transmit data. Where both periodic maintenance messages and handoff maintenance messages are required, a hybrid approach can be adopted where responsibility for the non-handoff periodic maintenance messages is distributed among the network of transmitting terminals while responsibility for handling handoff messaging remains with one transmitting terminal for an extended period of time.

The technique for sharing a communication session established by one transmitting terminal with a group of transmitting terminals enables multiple terminals to simulate the traffic of a single virtual terminal and results in a more efficient use of link resources, particularly where numerous individual terminals frequently require only a brief period of time to convey a short burst of data, such as sensor or telemetry data, position location information (PLI) being one example.

The above and still further features and advantages of the present invention will become apparent upon consideration of the following definitions, descriptions and descriptive figures of specific embodiments thereof wherein like reference numerals in the various figures are utilized to designate like components. While these descriptions go into specific details of the invention, it should be understood that variations may and do exist and would be apparent to those skilled in the art based on the descriptions herein.

DETAILED DESCRIPTION

Figure 1:
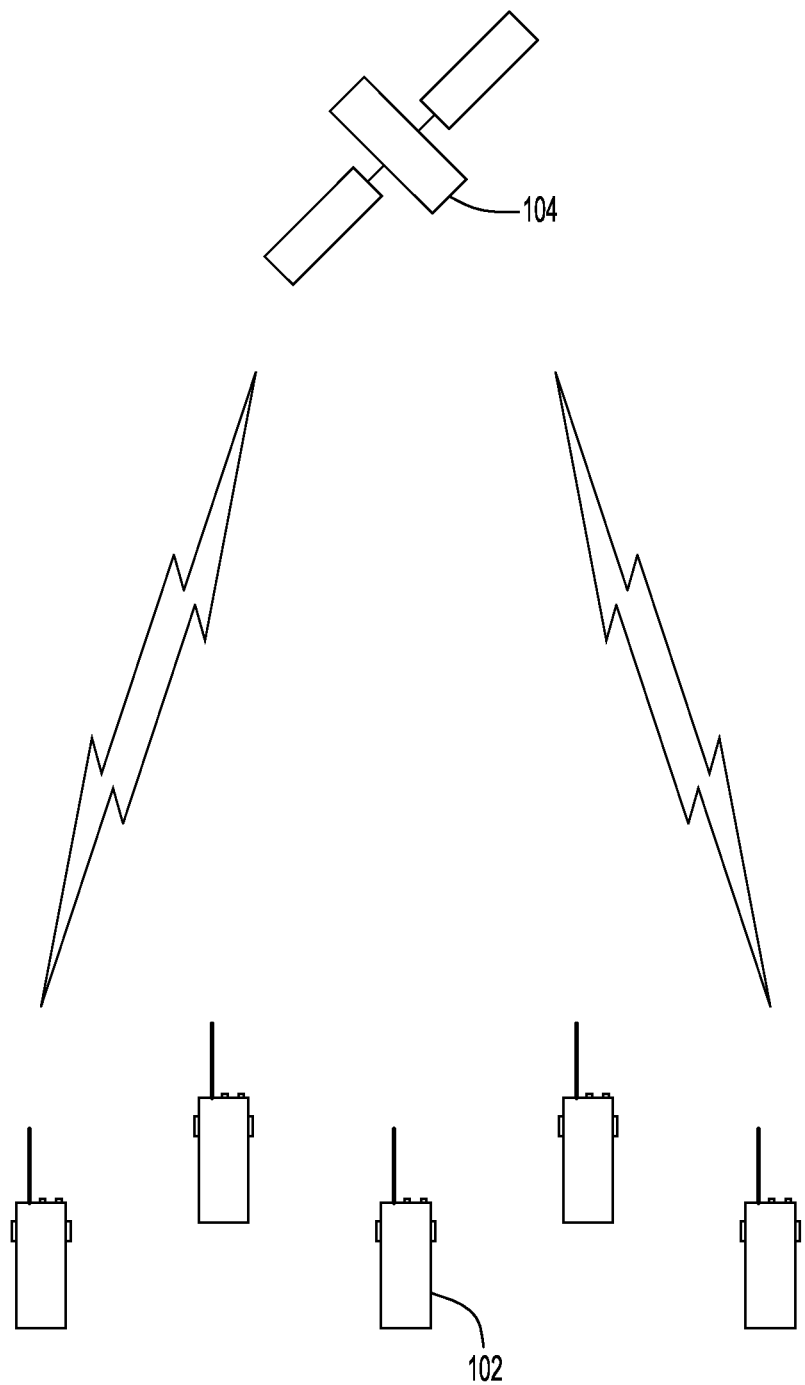
FIG. 1 is a conceptual diagram illustrating a portion of a satellite communication system including a group of terrestrial terminals located within the same satellite beam coverage area and communicating with an Earth-orbiting satellite.

The techniques described herein for aggregating transmission of data messages from a group of transmitting terminals by simulating the behavior of a single virtual terminal are suitable for implementation in a wide variety of communication systems including cellular, WiMAX, low Earth orbit (LEO) satellite communications (e.g., the Iridium system), and geostationary Earth orbit (GEO) satellite communications. FIG. 1 conceptually illustrates an example context involving a satellite communication system such as the Iridium satellite system. Geographically distributed subscriber units 102 are capable of transmitting radio signals to and receiving radio signals from satellites in the Iridium satellite constellation (one such satellite 104 is shown in FIG. 1). The Iridium subscriber devices can be wireless radios or telephones or some form of data modem devices and can transmit and receive voice signals and/or data (e.g., text, image, video, etc.). At any given time, there are 66 operational satellites in the Iridium constellation, and each satellite has three antenna panels with 16 spot beams for a total of 48 spot beams per satellite. Since the satellites are in low Earth orbit, the region of the Earth's surface covered by each of the individual antenna beam patterns is constantly shifting.

Conventionally, when a subscriber places a call or initiates a transmission from an Iridium subscriber unit, the transmission traverses the network via an uplink from the subscriber unit to a satellite. The satellite, acting as a transponder, may route the transmission to another subscriber unit or to an Earth terminal facility via a downlink or to another satellite via a cross link, with the transmission ultimately being down linked to another subscriber unit or to an Earth terminal facility by another satellite. The Earth terminal facilities provide a radio-link interface between the satellites and other terrestrial facilities, such as gateway facilities linking calls to other networks.

A netted Iridium service is also available in which a satellite receiving an uplink transmission from a subscriber unit within a particular beam operates as a transponder and broadcasts the transmission via a downlink on the same antenna beam. This mechanism creates a point-to-multipoint link between the transmitting subscriber unit and other networked subscriber units within the same antenna beam coverage area, providing a push-to-talk like service among subscriber units operating on the same call network. In effect, the Netted Iridium service allows voice or data messages to be broadcast to other subscriber units operating within the same antenna beam coverage area such that, about 95% of the time, messages can be exchanged in this manner between subscriber units within about 100 miles of each other. As explained in greater detail below, the techniques described herein can be employed within the context of the netted Iridium service to allow subscriber units to report sensor data such a position location information (PLI). However, it will be appreciated that the techniques for allowing multiple terminals to simulate data traffic of a single virtual terminal are not limited to the contexts of the netted Iridium service, transmission of sensor data, or even satellite communications in general.

Figure 2:
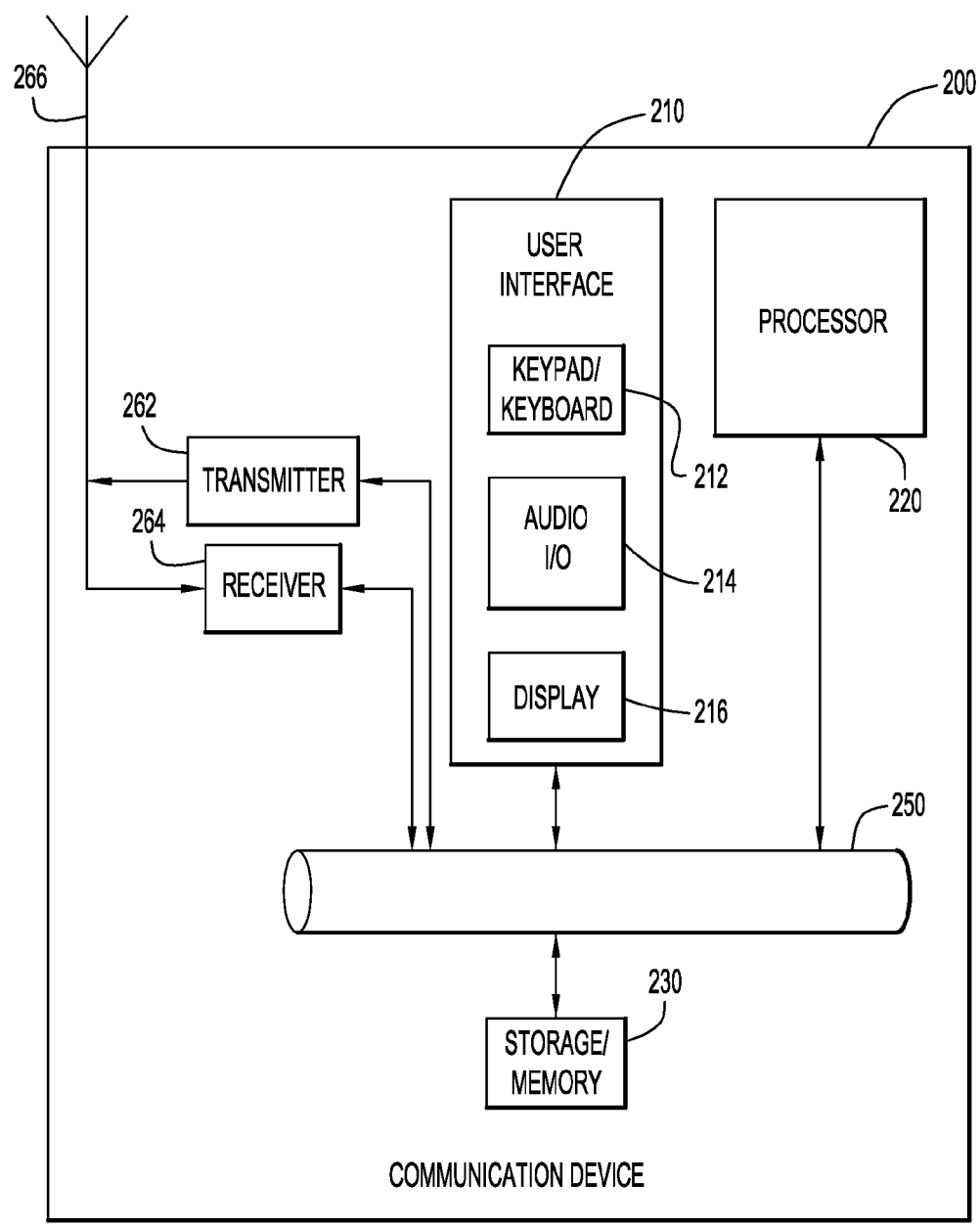
FIG. 2 is a notional block diagram illustrating major components of a communication terminal.

FIG. 2 is a block diagram illustrating an example of a communication terminal 200 configured to operate with other communication terminals to simulate data traffic of a single terminal. As used herein, the term communication terminal or simply "terminal" can be any device capable of transmitting and/or receiving signals, including but not limited to: a fixed-position or mobile RF transmitter or receiver, a handheld or body-mounted radio; any type of wireless or mobile telephone (e.g., analog cellular, digital cellular, or satellite-based); a radio carried on, built into or embedded in a ground-based or airborne vehicle; a satellite-mounted transmitter or receiver; or any electronic device equipped with wireless transmission or reception capabilities, including multimedia terminals capable of transmitting and/or receiving audio, video, and data information. As used herein, the term "terrestrial" refers to any ground-based, maritime, or airborne location (i.e., not in orbit or in space).

Communication terminal 200 includes a transmitter 262 and a receiver 264 coupled to an antenna 266 for transmission and reception of signals. For example, transmitter 262 is capable of transmitting message signals through antenna 266 to a receiving terminal (e.g. a satellite) in the network. Receiver device 264 is capable of receiving message signals through antenna 266 from other terminals in the network (e.g., from a satellite). Transmitter 262, receiver 264, and antenna 266 can be configured to communicate virtually any type of content, including but not limited to: audio/voice signals and data signals, including video or visual display signals, and any other types of media or content.

Communication terminal 200 includes a user interface 210 that allows a user to interact with device 200 (e.g., send and receive voice or audio signals; enter text, data, commands, etc.; and view images, video, text, data, etc.). User interface 210 can include a display device 216, user input devices such as a keypad/keyboard 212, and an audio input/output 214 such as a microphone and speaker. Display device 216 can be any of a wide variety of known devices, such as an LCD display. Keypad/keyboard 212 allows the user to enter alphanumeric characters and can be configured as a physical device and/or as a keyboard or keypad depicted on display device 216. In the latter case, characters can be selected by moving a cursor, or by touching the screen in the case of a touch-screen display. It will be appreciated that user interface 210 may include other types of user-input devices such as a cursor control device, joystick, etc.

Communication terminal 200 further includes a processing capability represented in FIG. 2 by processor module 220. Processor 220 is capable of executing program instructions (i.e., software) for carrying out various operations and tasks. For example, processor 220 can interpret and respond to data and commands received from and receiver 264, perform computations, cause message signals to be transmitted by transmitter 262, cause information to be stored, and control the display 216 of user interface 210. Processor 220 is, for example, a microprocessor, a microcontroller, a digital signal processor, etc.

A storage capability of terminal 200 is represented by storage/memory module 230, which can store information relating sensor data such as position location information (PLI) derived from reception of global positioning system (GPS) signals or the like, as well as other data or information. Storage/memory module 230 can also store program instructions (i.e., software) to be executed by processor 220 to carry out operations. Thus, the operations and methodologies described herein can be carried out by executing instructions stored on a computer readable medium (i.e., software) on a processor or processors located within communication terminal 200. As used herein, the term "computer readable medium" refers to non-transitory (tangible) media (e.g., memory or storage devices). Storage/memory module 230 is a tangible processor-readable or computer-readable memory that stores or is encoded with instructions that, when executed by processor 220, cause processor 220 to perform the functions described herein. While FIG. 2 shows a processing environment comprising a data processor 220 that executes software stored in storage/memory module 230, an alternative processing environment may include a fixed data processing element, such as an application specific integrated circuit (ASIC) that is configured, through fixed hardware logic, to perform the functions of the logic. Yet another possible data processing environment is one involving one or more field programmable logic devices or firmware, or a combination of fixed processing elements and programmable logic devices.

The interconnections between the components of communication terminal 200 are represented generally in FIG. 2 with a bus structure 250. In general, user interface 210, processor 220, storage/memory module 230, transmitter 262, and receiver 264 can be interconnected in any suitable manner.

In many types of communication systems, in order for a terminal to transmit a message containing content (voice, video, data, etc.) to another terminal, a communication session must be established over a link or channel. Specifically, handshaking signals must be exchanged between the terminals to set up the session prior to transmission of messages containing content. Typically, after the content messages have been transmitted, one or both of the terminals send a final message to terminate the session or keep the session open until a timeout period has elapsed without further communication. In many cases, the amount of overhead time on a link or channel resulting from setting up and tear down a session is small in comparison to the link resources used to transmit the content messages. For example, the call set-up time for a full-duplex voice call lasting several minutes constitutes a very small fraction of the overall call time.

However, in circumstances where the time required to transmit content is brief, the overall time of the communication session can be at least an order of magnitude greater than the actual time required to transmit the content messages. For example, an Iridium subscriber unit equipped with a GPS receiver or other position determining equipment is capable of determining and tracking its own position (e.g., latitude, longitude, and altitude), and it may be desirable periodically to disseminate this information to other subscriber units or to a central controller. The time required to transmit a burst message containing this position location information (PLI) may be only about one-tenth of a second, but the overall time to set up and tear down a communication session with a satellite to send this message requires about three seconds. In a network where tens, hundreds, or even thousands of subscriber units are individually periodically reporting PLI data, this reporting process is inefficient and uses a significant amount of overhead link resources that could be used for other types of traffic.

The technique described herein reduces the overhead associated with transmitting data traffic, particularly intermittent short bursts of data traffic, by allowing a plurality of transmitting terminals to transmit data messages within a communication session established by one transmitting terminal such that the other transmitting terminals do not need to separately establish a session before transmitting their data messages. By aggregating transmission of data messages from a plurality of transmitting terminals into a common communication session, the link resources that would otherwise have been used to set up and tear down sessions for each terminal can be used for other traffic. From the perspective of the receiving terminal, it is receiving messages from a single transmitting terminal within the communication session. The technique is transparent to the receiving terminal, which is unaware that multiple terminals are actually transmitting messages to the receiving terminal within the session and does not cooperate in the scheme of having multiple terminals operate as a single terminal.

Figure 3:
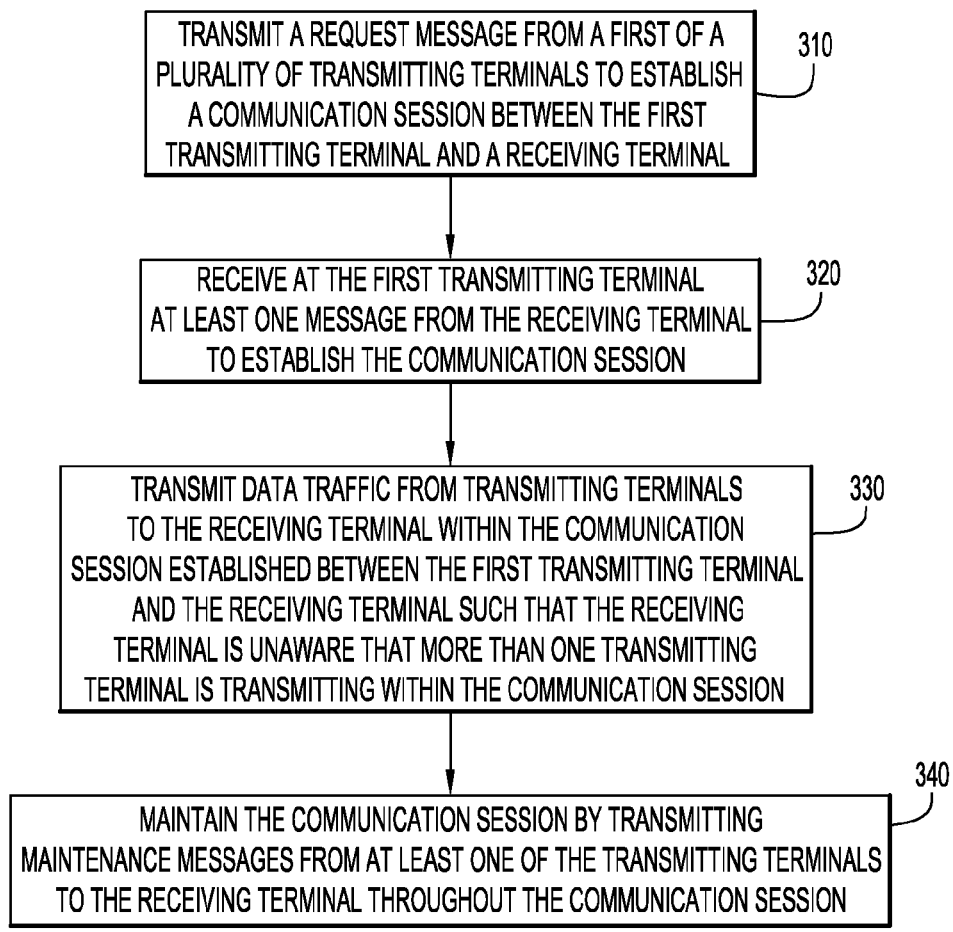
FIG. 3 is functional flow diagram of operations performed to enabling multiple terminals to simulate traffic of a single terminal within a communication session with a receiving terminal.

Operations performed by a plurality of transmitting communication terminals to simulate data traffic of a single virtual terminal within a communication session are shown in the flow diagram of FIG. 3 at a top level. In operation 310, a first of a plurality of transmitting terminals transmits a request message to a receiving terminal to initiate the process of establishing a communication session between the first transmitting terminal and the receiving terminal. In operation 320, the first transmitting terminal receives at least one message from the receiving terminal to establish the communication session. Essentially, these operations require an exchange or handshaking between the transmitting and receiving terminal to establish the communication session.

Once the communication session has been established between the first transmitting terminal and the receiving terminal, in operation 330, the transmitting terminals transmit data traffic to the receiving terminal within the communication session such that the receiving terminal is unaware that more than one transmitting terminal is transmitting within the communication session. As will be better understood from the examples provided below, while the transmitting terminals coordinate their use of the link during the session using one or more multiplexing schemes, the receiving terminal simply handles the data traffic as though it has been sent from a single source and does not perform any de-multiplexing and does not separate the messages according to the source terminal. Rather, the receiving terminal passes the messages to another point in the network via a point-to-point transmission or via a broadcast (point-to-multipoint) without evaluating the content.

Referring still to FIG. 3, in operation 340, the communication session is maintained by transmitting maintenance messages from at least one of the transmitting terminals to the receiving terminal throughout the communication session. As will be described in the following examples, maintaining the shared communication session may involve transmitting maintenance messages to inform the receiving terminal that the session is still active and, in the case of satellite communications, may involve transmitting messages for coordinating handoff of the communication session from one satellite beam to another as the coverage areas of the satellite beams shift over time. Responsibility for transmitting these maintenance messages can reside with one terminal within the group of terminals sharing the communication session, or responsibility can be distributed among the terminals in the group to effect distributed link management.

The following examples illustrate the concepts related to a group of transmitting terminals simulating a single virtual terminal within a communication session in the context of the Iridium satellite communication system, and in particular, in the context of a netted Iridium service in which the transmitting terminals are using the common communication session to transmit sensor data such as PLI data. In this context, it may be desirable for terminals (subscriber units) to report their positions regularly to other terminals. For example, a group of soldiers deployed in a military exercise and having Iridium-equipped radios may need to report their positions to each other and to a local or central command center. Using the netted Iridium service, each terminal can broadcast its position to other terminals within its network by sending an uplink message to the satellite transponder, which broadcasts the data message to all terminals within the same satellite beam via a downlink message, thereby quickly disseminating the PLI data throughout the network and supporting tracking of the terminal's position.

Figure 4:
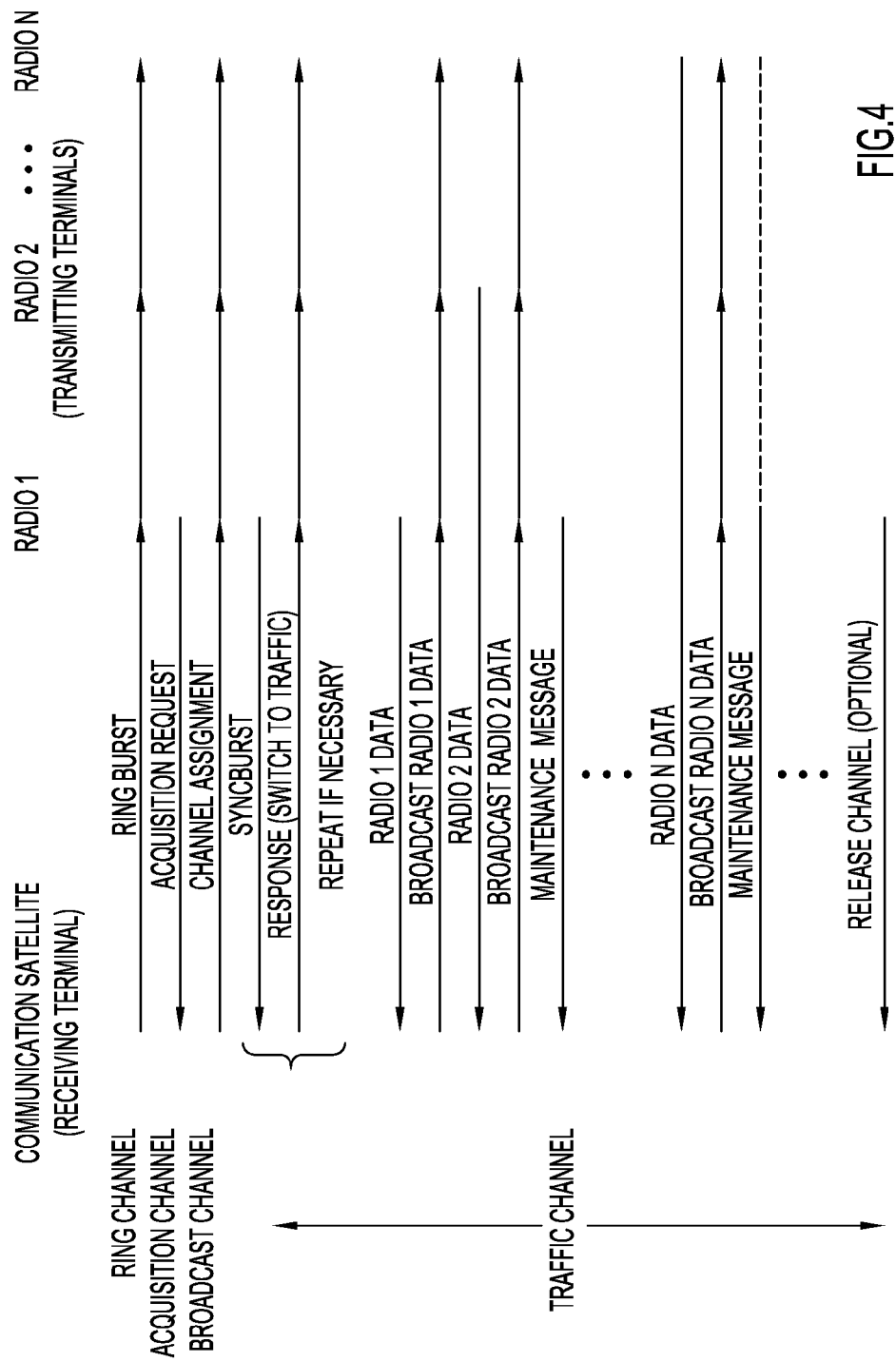
FIG. 4 is a signaling diagram illustrating a sequence of messages conveyed between a group of transmitting terminals and a receiving terminal during a communication session for transmitting data messages.

FIG. 4 is a signaling diagram illustrating within this example embodiment a sequence of messages conveyed between a group of transmitting terminals (e.g., terrestrial subscriber units) and a receiving terminal (e.g., a communication satellite) during a communication session for transmitting data messages (e.g., sensor data such as PLI data). The communication satellite periodically (e.g., every 90 ms) broadcasts a Ring Burst message on a ring channel. In the case of the Iridium system, the low Earth orbits of the satellites cause the satellites to travel from horizon to horizon in about ten minutes. The Ring Burst messages convey information that allows terrestrial terminals essentially to determine where the broadcasting satellite is in sky, whether the satellite is gaining or waning, measure angular velocity and Doppler shift to enable determination of the correct frequency for communication, and to obtain necessary timing information for communication.

When a terminal (represented by $Radio_1$ in FIG. 4) wishes to establish a communication session with a satellite, the terminal transmits an acquisition request message to the satellite on an acquisition channel, which may be at a different frequency from the ring channel. Upon successfully receiving the acquisition request message, the satellite broadcasts a channel assignment message on a broadcast channel, indicating a traffic channel (e.g., a specific frequency) the requesting terminal should use to transmit its messages during a communication session. Note that other terminals (represented by $Radio_2$ through $Radio_N$ in FIG. 4) within the same satellite antenna beam also receive this information and are therefore aware that a communication session is being established between the initiating terminal ($Radio_1$) and the satellite.

Once the traffic channel has been assigned, the initiating terminal transmits a Syncburst message on the traffic channel. The Syncburst message allows the satellite to evaluate how accurately the required timing and frequency are known by the transmitting terminal. The satellite measures timing and frequency offsets between the received Syncburst message and the correct values. If the timing and frequency errors are within tolerance levels, satellite sends a Switch to Traffic message to the initiating terminal on the traffic channel to notify the initiating terminal that data traffic can be sent on the traffic channel. If the timing and frequency errors determined from the Syncburst message are not within acceptable tolerances, the satellite sends on the traffic channel a reply message to the initiating terminal containing correction information. In this case, the initiating terminal then sends another Syncburst message using timing and frequency values adjusted according to the feedback information provided by the satellite. This process can be repeated until the timing and frequency values used in the Syncburst message received by the satellite are within acceptable tolerances or until a maximum number (e.g., three) of Syncburst messages have been sent.

Note that the feedback messages and the Switch to Traffic messages transmitted by the satellite on the traffic channel in response to the Syncburst messages are observable by any terminal tuned to the traffic channel. Thus, by passively listening to the messages transmitted by the satellite, other terminals within the same satellite beam as the initiating terminal can be aware of when the traffic channel is available for the communication session. In essence, the other terminals receive the benefit of the synchronization performed between the initiating terminal and the satellite without incurring any overhead and, in effect, perform passive synchronization simply by listening to the satellite broadcasts.

In a more conventional approach, once the traffic channel is available, the initiating terminal might send a data message such as a PLI data message and then end the communication session by sending a Release Channel message to the satellite. In this scenario, an elapsed time of about three second from the acquisition request to the channel release would be required to transmit a burst data message lasting only about one-tenth of a second. As shown in FIG. 4, according to the technique described herein, once the satellite sends the Switch to Traffic message to the initiating terminal, a plurality of transmitting terminals (represented by $Radio_1$ through $Radio_N$ in FIG. 4) transmits data messages to the satellite within the communication session established between the initiating terminal and the satellite. In the case of transmitting sensor data, such as PLI data, each radio uses a portion of the traffic channel resource to send a PLI data message. In the example shown in FIG. 4, a TDMA scheme is employed in which the radios are assigned time slots and sequentially send data messages to the satellite. For example, $Radio_1$ (the initiating terminal) through $Radio_N$ successively send data messages on the same traffic channel within the same communication session. In the netted Iridium mode, upon receiving each data message, the satellite operates as a transponder and immediately retransmits the data messages as downlink broadcasts on the same antenna beam such that other terminals within the same beam coverage area receive the data messages. This is represented in FIG. 4 via the signal lines labeled "Broadcast Radio i Data" (i=1 to N) extending from the satellite to each $Radio_1$ through $Radio_N$. In this manner, the data messages from each of the terminals are disseminated to all of the other terminals within the network of terminals operating within the satellite beam. With PLI data, this allows each terminal to know the current position of all other terminals in the same network.

If the data transmission requirements of the group of transmitting terminals do not necessitate keeping the communication session open continuously, once the data messages from the terminals have been transmitted, a Release Channel message can be sent from the initiating terminal (or another terminal in the network) to end the communication session. According to another option, the communication session can be kept open indefinitely without releasing the channel, and each terminal within the network can in turn periodically or repeatedly send burst messages within the session. For example, suppose 100 terminals are currently sharing a session for transmitting sensor data, and each terminal is required to report the sensor data once every minute. If this volume of data can be handled in about 10 seconds, one option would be to set up and tear down a 10-second session once every minute. Another option would be to spread out the reporting of the terminals over the course of a minute and keep the session open continuously, thereby spreading out the instantaneous load.

A netted sensor messaging scheme that implements a single virtual terminal with a group of terminals in a satellite antenna beam using a netted Iridium service enables sensor data such as PLI data to be reported with low latency and with an improvement in link usage efficiency of over an order of magnitude (e.g., about a thirty-fold to fifty-fold improvement). For example, if each PLI report message requires a single 8.28 ms L-band burst, over 600 terminals reporting PLI data every minute can be supported by a single communication session. With twenty concurrent communication sessions and a five minute PLI reporting period, 60,000 terminals can readily be supported.

In order to keep a communication session open, it is necessary in some contexts to perform link maintenance throughout the session. In the example of the netted Iridium service, transmit opportunities are segmented into 90 ms frames, and a periodic maintenance message or "burst" must be transmitted by the terrestrial terminal to the satellite every fourth frame in order to maintain the communication session, as suggested by the maintenance messages shown in the diagram of FIG. 4. The maintenance bursts can also be used to request power level or frequency adjustments or to handle satellite beam handoffs as described below.

Where a network of terminals is simulating operation of a single virtual terminal, a number of options exist to provide the periodic maintenance messages. One option is to have a single terminal within the group transmit all of the periodic maintenance messages. The maintenance terminal can be the same terminal that initiated the communication session or some other terminal within the network of terminals. This static approach relieves all of the other terminals within the group of any maintenance overhead. However, every fourth 90 ms frame must be allocated to the terminal maintaining the session, and assuming that terminal does not require use of the session to transmit data that frequently, this approach reduces the throughput available from the session by about 25%.

According to a more dynamic approach, the terminals implement a distributed link management scheme in which the terminals collectively coordinate link maintenance such that the burden of maintaining the link is distributed among the terminals. In this case, different terminals send the periodic maintenance messages to the satellite at different times during the session. From the satellite's perspective, only a single terminal is transmitting the periodic maintenance messages such that the group of terminals simulates operation a single terminal. For example, a sequence of N 90 ms frames in the session can be respectively allocated to N terminals such that the terminals transmit sensor data in a time-multiplexed manner. Within the sequence of transmissions, the periodic maintenance messages must nevertheless be transmitted every fourth frame. To efficiently distribute link maintenance, in each frame requiring transmission of a maintenance message, the terminal scheduled to transmit a data message in that frame also assumes responsibility for transmitting the periodic maintenance message.

With a low Earth orbit satellite communication system, link maintenance also involves frequently handing off the traffic channel from one satellite beam to another. In the Iridium system, satellite beam handoffs are required every 30 to 60 seconds. Thus, once a communication session remains open for about 20 to 30 seconds, it becomes necessary to monitor the need for a satellite beam handoff and to execute handoffs. The handoff process can be handled via the periodic maintenance burst messages, and responsibility for executing handoffs can be static, remaining with a single terminal, or dynamically allocated among the group of terminals sharing the communication session, as previously described. One potential difficulty with distributing the handoff operation among a group of terminals is that different terminals may make different decisions about when a handoff is necessary or make different decisions about the beam to which the channel should be handed off. For example, if the terminals sharing the session are distributed over many miles, some terminals may be closer to the edge of the current beam coverage area than others and may conclude that a handoff is required sooner than a terminal located closer to the center of the beam coverage area. Consequently, distributing handoff responsibility among the terminals may result in irregular handoff intervals and potentially cause service disruption. Further, different terminals may decide to switch to different beams, depending on their particular geographical position, and certain beams may be less desirable than others for the group overall.

A hybrid maintenance approach can be adopted to address the difficulty of distributing control of satellite beam handoffs while still enjoying the benefits of distributed link management. With the hybrid option, periodic maintenance messages that do not involve satellite beam handoff control are distributed among the terminals sharing the communication session, while a single terminal remains responsible for managing handoff operations and transmission of handoff maintenance messages throughout the communication session. Optionally, for communication sessions that remain open for extended periods of time or indefinitely, under the hybrid option, control of handoff operations can be transferred from one terminal to another at some point in the session; however, each handoff control terminal would remain responsible for handling satellite beam handoffs for several consecutive handoff cycles (e.g., at least several minutes) to ensure consistency in the handoff process over time. Since a maintenance message is required every fourth 90 ms frame (e.g., every 360 ms) and handoffs occur much less frequently (e.g., one or two per minute), only a small fraction of the maintenance messages involves handoff instructions. Accordingly, the hybrid approach in which one terminal maintains control over handoff operations has a relatively minor impact on distribution of the maintenance messages among the terminals in the group and does not significantly reduce the efficiency of the distributed link management scheme.

Within the communication session, the transmitting terminals are coordinated and synchronized such that all transmissions are aligned to create a single virtual terminal. A simple approach for allocating resources within a communication session is to have a single terminal broadcast assignments to other terminals.

According to a more sophisticated approach, a centralized net manager capable of communicating with the individual terminals can operate as an overall scheduler, assigning time slots statically or periodically reassigning slot assignments. The net manager can be a central computer system that configures terminals into a sensor network that shares a communication session in a multiplexed manner. For example, each of N terminals can be assigned every Nth frame to transmit sensor (e.g., PLI) data. The net manager can also establish criteria for transmitting sensor data (e.g., the terminals can be configured to send PLI data every 30 seconds or whenever the terminal had moved more than a certain distance from the last reported position). This dissemination of the configuration can be carried out via short burst data (SBD) messages transponded via a satellite at an agreed upon time (e.g., once a day) or at the initialization of a sensor network sharing a session. These messages can be used to assign time slots to the individual terminals in order to coordinate the scheduling of transmissions of the terminals within the shared session. Optionally, the sensor network can be managed automatically by the net manager to ensure maximum utilization of the link resources.

Another option is to use a more dynamic approach involving peer-to-peer or crosslink communications to negotiate and allocate slot assignments among the terminals sharing a communication session to transmit data traffic. For example, a self-forming network approach can be employed in which terminals can be introduced into the network and assigned a transmission slot in a contention free manner. Such a network can be self-stabilizing, wherein an arbitrary collection of radios automatically resolves radio link usage schedules.

In the example embodiment, approximately 600 terminals can report their location once every minute. However, for purposes of voice communication, a typical netted Iridium tactical network or "talk net" might involve only five to fifteen radios, which would drastically under-utilize the link resource if the communication session were to be kept open continuously. To take full advantage of the link resources of a continuous shared session, several such talk nets (up to twenty or thirty) can be included in a single sensor network. This approach contemplates that different networks are used for conveying voice traffic and data traffic such as PLI data, wherein a sensor network supports terminals from multiple voice networks. In other words, terminals from several different independent talk nets may be sharing the same communication session for purposes of conveying sensor data. Since the netted Iridium system involves a satellite broadcasting back to all of the terminals in the same beam, to prevent the sensor data of an individual terminal from being disseminated to other terminals outside of its own talk net, the data messages transmitted within the session can be encrypted with voice net keys such that only members of the same voice net can decrypt the data traffic. A sensor network configured in this manner thereby includes terminals that are not aware of each other and may be in use for different missions or completely different user communities but are nevertheless reporting sensor data such as PLI data on the same channel within the same communication session. This mechanism allows tremendous aggregation of traffic and, relative to a conventional approach, actually reduces the data traffic load while deploying more terminals.

Thus, in the context of the example embodiments, one aspect of the described technique is netted sensor messaging involving a new approach to sending arbitrary messages, such as sensor data, utilizing the netted Iridium service. Another aspect of the technique is distribute link management in which a communication session with an Iridium satellite is maintained by multiple terminals in a manner that appears to be a single "virtual" terminal from the satellite's perspective. By simulating the traffic of a single virtual terminal in a shared communication session, multiple terminals spread over a region covered by a single netted Iridium net can aggregate their data traffic such that thirty to fifty times the amount of data traffic throughput can be achieved by avoiding the overhead associated with setting up and tearing down individual communication sessions for each terminal. This scheme leverages the netted Iridium architecture to provide a highly scalable message dissemination and distributions capability that supports a large number of sensor devices operating simultaneously within a specific geographic region. The design approach can also allow for variable length messages, enabling support for a diverse set of sensor applications.

While the foregoing example embodiments describe a netted sensor messaging scheme in which the satellite transponder broadcasts the aggregated stream of data messages back to the terrestrial terminals within the sensor network, it will be appreciated that the satellite can also forward the aggregated data traffic to another satellite and ultimately to a terrestrial gateway where the traffic can be processed and routed terrestrially. Thus, the techniques described herein for simulating a virtual terminal are not limited to the netted context in which all communications remain within a common satellite beam.

Having described techniques for enabling multiple terminals to simulate traffic of a single terminal, it is believed that other modifications, variations and changes will be suggested to those skilled in the art in view of the teachings set forth herein. It is therefore to be understood that all such variations, modifications and changes are believed to fall within the scope of the present invention as defined by the appended claims. Although specific terms are employed herein, they are used in a generic and descriptive sense only and not for purposes of limitation.

What is claimed is:

1. A method of enabling multiple terminals to simulate traffic of a single terminal, comprising:
   transmitting from a first transmitting terminal a request to establish a communication session between the first transmitting terminal and a receiving terminal, the first transmitting terminal being one of a plurality of transmitting terminals;
   receiving at the first transmitting terminal at least one message from the receiving terminal to establish the communication session and provide an open channel between the first transmitting terminal and the receiving terminal;
   transmitting data traffic from the plurality of transmitting terminals to the receiving terminal within the communication session established between the first transmitting terminal and the receiving terminal using a multiplexing scheme where the plurality of transmitting terminals share the open channel and such that the receiving terminal passes the data traffic to another point in the network without de-multiplexing the data traffic and is unaware that more than one transmitting terminal is transmitting within the communication session; and
   maintaining the communication session by transmitting maintenance messages from at least one of the plurality of transmitting terminals to the receiving terminal throughout the communication session,
   wherein the transmitting terminals are terrestrial devices transmitting to the receiving terminal that is a satellite.

2. The method of claim 1, wherein maintaining the communication session includes transmitting maintenance messages from at least two of the plurality of transmitting terminals to the receiving terminal to distribute responsibility for maintaining the communication session among the plurality of transmitting terminals.

3. The method of claim 1, wherein maintaining the communication session includes transmitting periodic maintenance messages from at least one of the plurality of transmitting terminals to the receiving terminal.

4. The method of claim 1, wherein the plurality of transmitting terminals are located within a common satellite beam coverage area, and wherein maintaining the communication session includes transmitting handoff messages supporting handing off of the communication session from one satellite beam to another satellite beam.

5. The method of claim 4, wherein maintaining the communication session includes transmitting periodic maintenance messages from at least one of the transmitting terminals to the receiving terminal.

6. The method of claim 5, wherein maintaining the communication session includes transmitting maintenance messages from at least some of the plurality of transmitting terminals to the receiving terminal to distribute responsibility for maintaining the communication session among the plurality of transmitting terminals.

7. The method of claim 6, wherein responsibility for transmitting the periodic maintenance messages is distributed among the plurality of transmitting devices and responsibility for transmitting the handoff messages is maintained by one of the plurality of transmitting devices.

8. The method of claim 1, wherein the plurality of transmitting terminals transmit sensor data within the communication session.

9. The method of claim 1, wherein the plurality of transmitting terminals transmit position location information within the communication session.

10. The method of claim 1, further comprising:
receiving a broadcast message from the receiving terminal containing the data traffic transmitted to the receiving terminal.

11. The method of claim 1, wherein transmitting data traffic includes multiplexing among the plurality of transmitting terminals via at least one of time division multiple access (TDMA), frequency division multiple access (FDMA), and code division multiple access (CDMA).

12. The method of claim 1, wherein transmitting data traffic includes time multiplexing in which individual transmitting terminals are sequentially scheduled to transmit data to the receiving terminal, and wherein maintaining the communication session includes transmitting periodic maintenance messages from the individual transmitting terminals that are scheduled to transmit data such that transmission of the periodic maintenance messages is distributed among the plurality of transmitting terminals.

13. A system for enabling multiple terminals to simulate traffic of a single terminal, comprising:
a plurality of transmitting terminals including a first transmitting terminal configured to transmit a request to establish a communication session with a receiving terminal and to receive at least one message from the receiving terminal to establish the communication session and provide an open channel between the first transmitting terminal and the receiving terminal;
wherein each of the plurality of transmitting terminals is configured to transmit data traffic to the receiving terminal within the communication session established between the first transmitting terminal and the receiving terminal using a multiplexing scheme where the plurality of transmitting terminals share the open channel and such that the receiving terminal passes the data traffic to another point in the network without de-multiplexing the data traffic and is unaware that more than one transmitting terminal is transmitting within the communication session; and
wherein at least one of the plurality of transmitting terminals is configured to maintain the communication session by transmitting maintenance messages to the receiving terminal throughout the communication session,
wherein the transmitting terminals are terrestrial devices configured to transmit to the receiving terminal that is a satellite.

14. The system of claim 13, wherein at least two of the plurality of transmitting terminals are configured to transmit maintenance messages to the receiving terminal to distribute responsibility for maintaining the communication session among the plurality of transmitting terminals.

15. The system of claim 13, wherein at least one of the plurality of transmitting terminals is configured to transmit periodic maintenance messages to the receiving terminal.

16. The system of claim 13, wherein the transmitting terminals are configured to be located within a common satellite beam coverage area, and wherein at least one of the transmitting terminals is configured to transmit handoff messages supporting handing off of the communication session from one satellite beam to another satellite beam to maintain the communication session.

17. The system of claim 13, wherein the transmitting terminals are configured to multiplex data traffic within the communication session via at least one of time division multiple access (TDMA), frequency division multiple access (FDMA), and code division multiple access (CDMA).

18. A non-transitory processor readable medium storing instructions that, when executed by a processor, cause the processor to:
generate a request message to be transmitted from a first transmitting terminal to establish a communication session between the first transmitting terminal and a receiving terminal;
process at least one message received from the receiving terminal at the first transmitting terminal to establish the communication session using a multiplexing scheme where the plurality of transmitting terminals share the open channel and;
generate at least one data message to be transmitted from the first transmitting terminal to the receiving terminal within the communication session;
use a multiplexing scheme associated with the open channel to schedule transmission of the at least one data message on the open channel so as not to conflict with data messages being transmitted by a plurality of other transmitting terminals on the open channel within the communication session, such that the receiving terminal passes the data traffic to another point in the network without de-multiplexing the data traffic and is unaware that more than one transmitting terminal is transmitting within the communication session; and
maintain the communication session by generating maintenance messages for transmission by the first transmitting terminal throughout the communication session,
wherein the transmitting terminals are terrestrial devices configured to transmit to the receiving terminal that is a satellite.

19. The non-transitory processor readable medium of claim 18, further comprising instructions that, when executed by a processor, cause the processor to:
transmit periodic maintenance messages from at least one of the plurality of transmitting terminals to the receiving terminal.

20. The non-transitory processor readable medium of claim 18, wherein the plurality of transmitting terminals are located within a common satellite beam coverage area and further comprising instructions that, when executed by a processor, cause the processor to:
transmit handoff messages supporting handing off of the communication session from one satellite beam to another satellite beam.

* * * * *